(12) United States Patent
Khesin

(10) Patent No.: US 9,680,864 B2
(45) Date of Patent: Jun. 13, 2017

(54) REMEDIATING ROGUE APPLICATIONS

(71) Applicant: Empire Technology Development LLC, Wilmington, DE (US)

(72) Inventor: Oscar Khesin, San Jose, CA (US)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 127 days.

(21) Appl. No.: 14/238,542

(22) PCT Filed: Jun. 18, 2013

(86) PCT No.: PCT/US2013/046341
§ 371 (c)(1),
(2) Date: Feb. 12, 2014

(87) PCT Pub. No.: WO2014/204446
PCT Pub. Date: Dec. 24, 2014

(65) Prior Publication Data
US 2015/0326586 A1 Nov. 12, 2015

(51) Int. Cl.
*H04L 29/06* (2006.01)
*G06F 21/56* (2013.01)
(Continued)

(52) U.S. Cl.
CPC .......... *H04L 63/145* (2013.01); *G06F 21/568* (2013.01); *H04L 63/1425* (2013.01);
(Continued)

(58) Field of Classification Search
CPC ..... H04L 63/20; H04L 63/10; H04L 63/0272; G06F 9/4418; G06F 11/1438; G06F 17/30; G06F 11/1441
See application file for complete search history.

(56) References Cited

U.S. PATENT DOCUMENTS

| | | | | |
|---|---|---|---|---|
| 8,495,743 B2 * | 7/2013 | Kraemer | ............... | G06F 21/554 726/22 |
| 8,839,432 B1 * | 9/2014 | Patil | ...................... | G06F 21/577 713/188 |

(Continued)

FOREIGN PATENT DOCUMENTS

| | | |
|---|---|---|
| WO | 2007075850 A2 | 7/2007 |
| WO | 2011159507 A1 | 12/2011 |
| WO | 2012027588 A1 | 3/2012 |

OTHER PUBLICATIONS

"CloudLock Apps Firewall for Google Apps," CloudLock, accessed at http://web.archive.org/web/20130510034538/http://www.cloudlock.com/applications/cloudlock-apps-firewall-for-google-apps/, accessed on Nov. 21, 2013, pp. 1-3.
"Dalvik (software)," Wikipedia, accessed at http://web.archive.org/web/20130425092632/http://en.wikipedia.org/wiki/Dalvik_(software), Mar. 18, 2013, pp. 1-7.
(Continued)

*Primary Examiner* — Amir Mehrmanesh
(74) *Attorney, Agent, or Firm* — Brundidge & Stanger, P.C.

(57) ABSTRACT

In one example embodiment, a remediating system may include a mobile communication device, to which an application is to be installed, and a remediator that may be configured to remediate the application and transmit the remediated version of the application to the mobile communication device for installation.

20 Claims, 4 Drawing Sheets

(51) Int. Cl.
*H04W 12/00* (2009.01)
*H04L 29/08* (2006.01)

(52) U.S. Cl.
CPC ............ *H04L 63/20* (2013.01); *H04W 12/00* (2013.01); *G06F 2221/033* (2013.01); *H04L 67/34* (2013.01)

(56) References Cited

U.S. PATENT DOCUMENTS

| | | | | |
|---|---|---|---|---|
| 2006/0117209 | A1* | 6/2006 | Drouet | G06F 21/568 714/4.1 |
| 2008/0177994 | A1* | 7/2008 | Mayer | G06F 9/4418 713/2 |
| 2009/0199296 | A1 | 8/2009 | Xie et al. | |
| 2010/0058472 | A1* | 3/2010 | Dotan | G06F 21/52 726/22 |
| 2010/0251000 | A1 | 9/2010 | Lyne et al. | |
| 2011/0047594 | A1 | 2/2011 | Mahaffey et al. | |
| 2012/0255012 | A1* | 10/2012 | Sallam | G06F 21/52 726/24 |
| 2012/0255013 | A1 | 10/2012 | Sallam | |
| 2012/0255014 | A1* | 10/2012 | Sallam | G06F 21/564 726/24 |
| 2013/0007701 | A1 | 1/2013 | Sundararam | |
| 2013/0305368 | A1* | 11/2013 | Ford | G06F 21/568 726/23 |
| 2014/0366136 | A1* | 12/2014 | Wright | G06F 11/28 726/23 |
| 2015/0188949 | A1* | 7/2015 | Mahaffey | H04L 63/20 726/1 |

OTHER PUBLICATIONS

Adhikari, R., "Can Amazon Save Android From Malware Hell?," linuxInsider, accessed at http://www.linuxinsider.com/story/74010.html, Dec. 20, 2011, pp. 1-4.
Lane, N.D., et al. "A Survey of Mobile Phone Sensing," IEEE Communications Magazine, pp. 140-150 (2010).
Sanders, B.M., "Privacy and Security Enhancements for Android Applications," University of California Davis, pp. 37 (2012).
Shipman, M., and Jiang, X., "Software Creates Privacy Mode to Help Secure Android Smartphones," accessed at http://web.archive.org/web/20130516192916/http://news.ncsu.edu/releases/wms-jiang-tissa/, Apr. 13, 2013, pp. 1-3.
Zheng, M., "ADAM: An Automatic and Extensible Platform to Stress Test Android Anti-Virus Systems," Detection of Intrusions and Malware, and Vulnerability Assessment Lecture Notes in Computer Science, vol. 7591, pp. 82-101 (2013).
Zhou, W., et al., "Detecting Repackaged Smartphone Applications in Third-Party Android Marketplaces," Proceedings of the second ACM conference on Data and Application Security and Privacy, pp. 317-326, ACM (2012).
Zhou, Y., et al., "Taming information-stealing smartphone applications (on Android)," Proceedings of the 4th international conference on Trust and trustworthy computing, pp. 93-107 (2011).
Cristofaro, E.D., and Soriente C., "PEPSI: Privacy-Enhanced Participatory Sensing Infrastructure," ACM WiSec, pp. 1-16 (2011).
International Search Report with Written Opinion for International Application No. PCT/US2013/046341 mailed on Nov. 1, 2013.
"Threats and Risks in Today's Mobile App Marketplace," accessed at http://web.archive.org/web/20121223050215/http://www.rsa.com/solutions/consumer_authentication/intelreport/11822_Online_Fraud_report_0912.pdf, Sep. 2012, pp. 6.

* cited by examiner

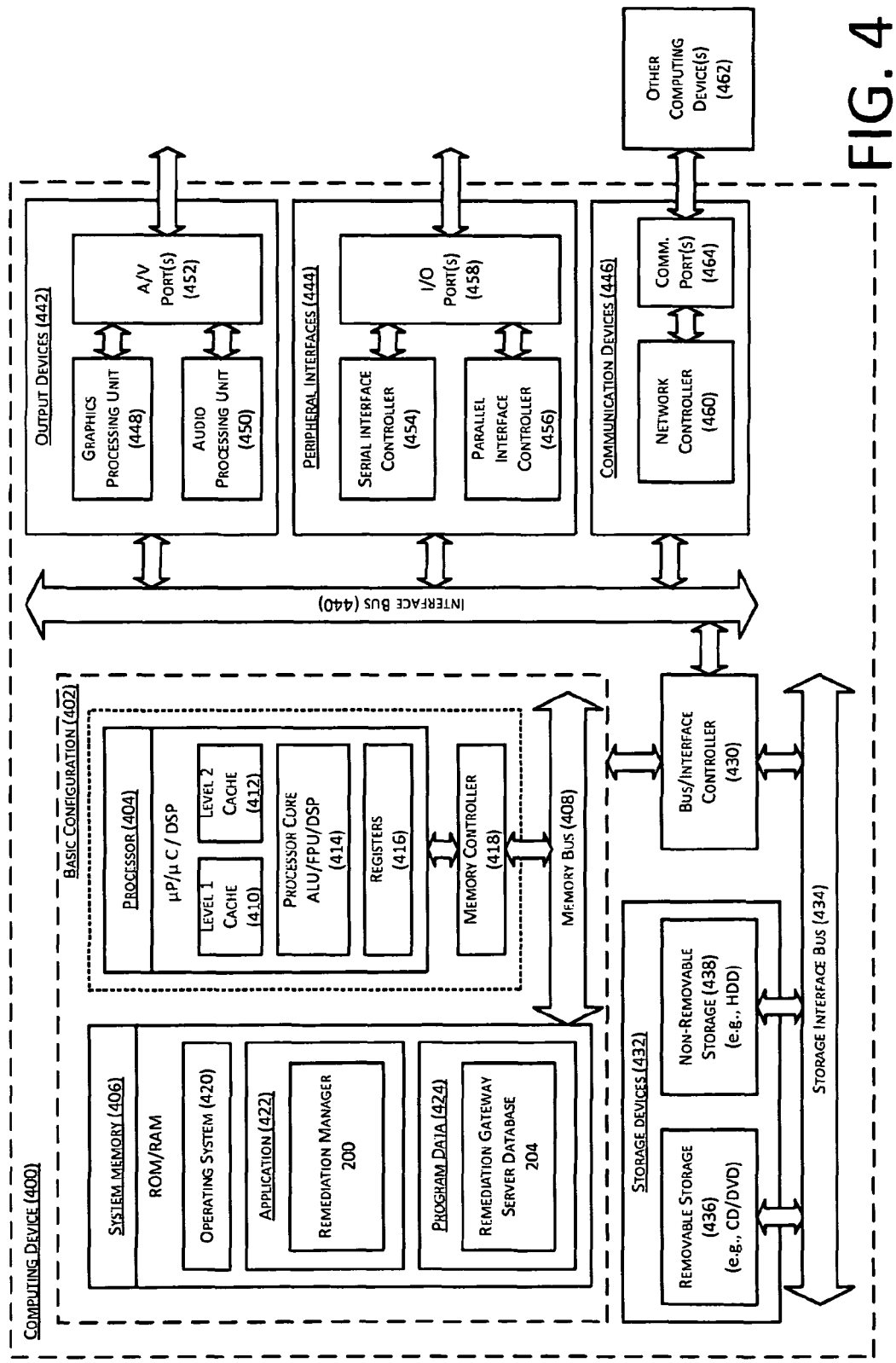

REMEDIATING ROGUE APPLICATIONS

CROSS-REFERENCE TO RELATED APPLICATION

This Application is the U.S. National Stage filing under 35 U.S.C. §371 of International Application Ser. No. PCT/US13/46341 filed on Jun. 18, 2013. The disclosure of the International Application is hereby incorporated herein by reference in its entirety.

TECHNICAL FIELD

The embodiments described herein pertain generally to remediating malicious applications prior to installation on a client device.

BACKGROUND

Unless otherwise indicated herein, the approaches described in this section are not prior art to the claims in this application and are not admitted to be prior art by inclusion in this section.

The ecosystem for client applications, particularly mobile applications, is a robust one that is, as a consequence, targeted by scammers and phishers. Even legitimate applications may be exploited by rogue authors who seek backdoors to gain users' private and/or sensitive data.

SUMMARY

In one example embodiment, a remediating system may include a mobile communication device, to which an application is to be installed, and a remediator that may be configured to remediate the application and transmit the remediated version of the application to the mobile communication device for installation.

In another example embodiment, a computer-readable medium may store executable-instructions that, when executed, cause one or more processors to perform operations including receiving an application, identifying potentially malicious code, removing the identified potentially malicious code, inserting replacement code in the place of the removed code, rebuilding the application, testing the rebuilt application in a virtual environment, and transmitting the rebuilt application to an intended client device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 4 shows a block diagram illustrating an example computing device by which various example solutions described herein may be implemented, arranged in accordance with at least some embodiments described herein.

DETAILED DESCRIPTION

Figure 1:
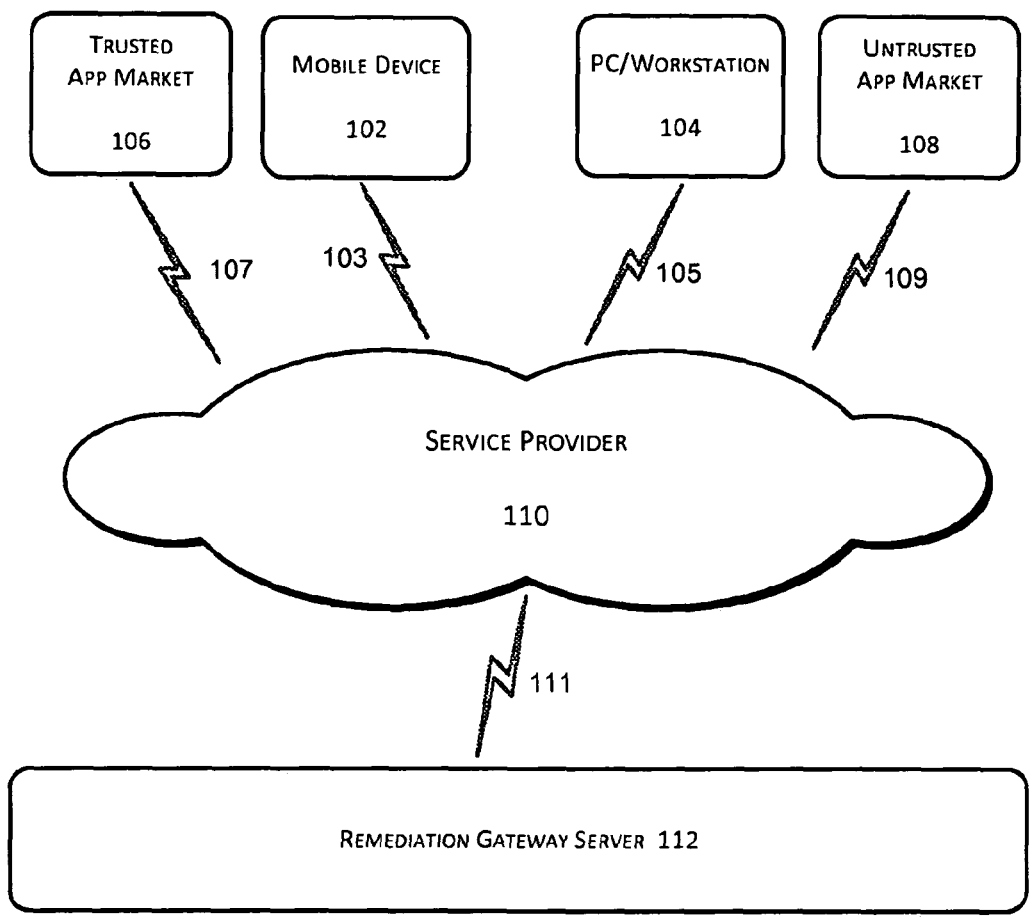
FIG. 1 shows an example market framework in which one or more rogue applications may be remediated, arranged in accordance with at least some embodiments described herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example market framework 100 in which one or more rogue applications may be remediated, arranged in accordance with at least some embodiments described herein. As depicted, market framework 100 includes, at least, a mobile device 102, a workstation 104, a trusted application market 106, an untrusted application market 108, a service provider 110, and a remediation gateway server 112. Data connections 103, 105, 107, and 109 may respectively communicatively couple mobile device 102, workstation 104, trusted application market 106, and untrusted application market 108 to service provider 110.

An unscrupulous mobile device, or even workstation, may download legitimate applications from both trusted and untrusted online markets. However, large proportions of malware may be delivered via repackaging of legitimate, i.e., trusted, applications. Thus, by the various embodiments described herein, trusted applications may be downloaded to remediation gateway server 112 to generate a database of trusted market application signatures, which may then be compared to stored malicious application signatures to detect re-packaging or other indicators of a rogue or malicious application.

Market framework 100 may pertain to an ecosystem by which a user or entity that exercises control over a client device may purchase or otherwise acquire confidence in an application purchased for hosting on the client device by not only having the purchased application scanned for malicious processes but also automatically converted and rebuilt into a remediated and safe application.

Mobile device 102 may refer to a client device that is configured to transmit and receive digital messages over a communication link to a mobile communications network provided by a wireless service provider. Mobile device 102 may be implemented as a portion of a small-form factor portable (or mobile) electronic device such as a mobile phone, cell phone, smartphone, personal data assistant (PDA), a personal media player device, an application specific device, a hybrid device that include any of the above functions, or as a personal computer including tablet, laptop computer and non-laptop computer configurations.

Workstation 104 may refer to a client device that is configured to transmit and receive digital messages over a communication link, and that may be implemented as a personal computer, also including tablet, laptop computer and non-laptop computer configuration, which may include a statically mounted device that remains stationary to execute the functions for which it is intended. Workstation 104 may be configured to be communicatively coupled to other devices by such non-cellular technologies, as well as any mobile communications technology, e.g., GSM, CDMA, etc., depending upon the wireless service provider.

Trusted application market 106 may refer to an online store that is designed to provide consumers and enterprise customers the ability to find, purchase, and/or deploy applications, which may be web-based or hosted on client devices. Trusted application market 106 may be deemed a trustworthy source of consumer and enterprise application as a result of receiving above-threshold scores of reliability by internet or online reputation systems, e.g., McAfee® TrustedSource®, or may be otherwise accorded a score or accreditation of reliability by a similar third-party. Non-limiting examples of trusted application market 106 may include Apple® App Store®, Amazon® Appstore, Google® Apps Marketplace®, Windows® Marketplace®, etc.

Untrusted application market 108 may refer to an online source of consumer-applications and enterprise-applications, which is not currently scored, accredited, or verified as a trusted source by an Internet or online reputation system or similar third-party.

Service provider 110 may refer to a corporate organization or business entity that provides communication and/or content services for mobile communications subscribers. In accordance with the embodiments described herein, service provider 110 may refer to a telecommunications service provider, an Internet service provider (ISP), an application service provider (ASP), or any combination thereof. Service provider 110 may provide mobile device 102 and/or workstation 104 with access to trusted app market 106 and untrusted app market 108.

As a telecommunications service provider, service provider 110 may provide mobile device 102 with wireless local area network (WLAN or IEEE 802.11), WiMAX™ (Worldwide Interoperability for Microwave Access), Bluetooth™, and other analog and digital wireless voice and data transmission capabilities.

As an internet service provider (ISP), service provider 110 may provide mobile device 102 and/or workstation 104 with both wireless and wired access to the Internet and any other public computer networking system.

As an application service provider, service provider 110 may provide mobile device 102 and/or workstation 104 with on-demand software or software as a service, which may be further regarded as providing access to one or more particular application programs using a standard networking protocol, e.g., HTTP. In some examples of market framework 100, trusted app market 106 may be integrated in service provider 110, embodied as application service provider.

Remediation gateway server 112 may refer to a service provider that is included in any of the aforementioned example embodiments of service provider 110 or is implemented as a stand-alone, third-party service. Regardless of its implementation, remediation gateway server 112 may refer to a service provider that detects malicious applications and rebuilds malicious applications into safe applications, in accordance with the various embodiments described herein. That is, remediation gateway server 112 provides for the detection and remediation of malicious applications into safe applications.

Data connections 103, 105, 107, and 109 may respectively communicatively couple mobile device 102, workstation 104, trusted application market 106, and untrusted application market 108 to service provider 110, utilizing at least one of multiple available communication protocols. The communication protocols may include any mobile communications technology, e.g., GSM, CDMA, etc., depending upon the technologies supported by service provider 110. The one or more data connections may be further implemented utilizing non-cellular technologies such as WI-FI™, wireless local area network (WLAN or IEEE 802.11), WiMAX™ (Worldwide Interoperability for Microwave Access), Bluetooth™, hard-wired connections, e.g., cable, phone lines, and other analog and digital wireless voice and data transmission technologies.

Figure 2:
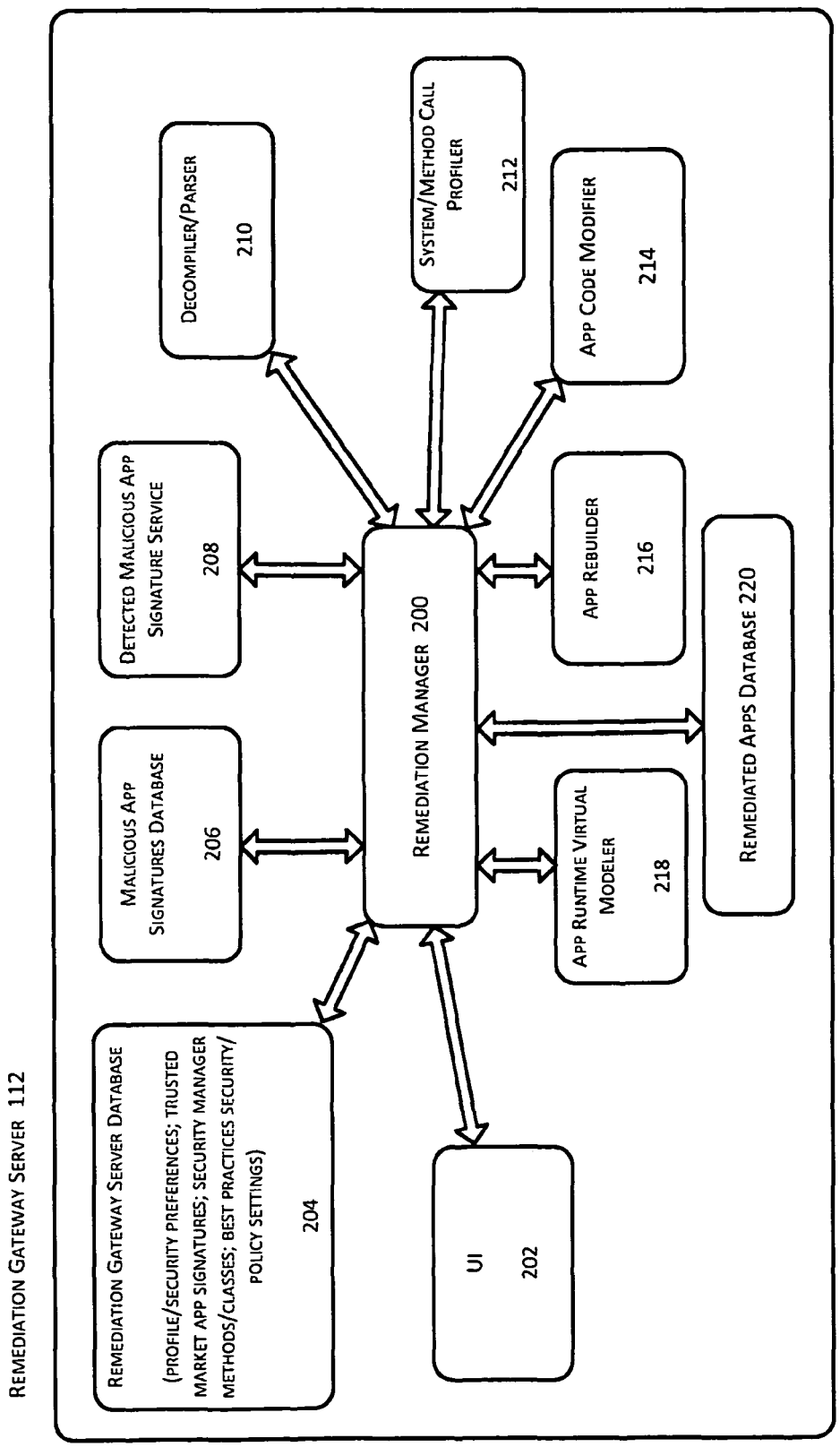
FIG. 2 shows an example remediation gateway server at which one or more rogue applications may be remediated, arranged in accordance with at least some embodiments described herein.

FIG. 2 shows an example remediation gateway server 112 at which one or more rogue applications may be remediated, arranged in accordance with at least some embodiments described herein. As depicted, remediation gateway server 112 may include a remediation manager 200, a user interface (UI) 202, a remediation gateway server database 204, a malicious application signatures database 206, a detected malicious application signatures service 208, a decompiler/parser 210, a system/method call profiler 212, an application code modifier 214, an application rebuilder 216, an application runtime virtual modeler 218, and a remediated applications database 220. Embodiments of remediation gateway server 112 may include the aforementioned features and components in varying combinations, all within the scope of the examples described herein.

Remediation manager 200 may refer to an application or program that is configured, programmed, or otherwise designed to manage, at least, remediation of malicious applications and authentication of applications that are at least suspected of being rogue or malicious, which may be submitted to remediation gateway server 112 regardless of whether a source of a respective one of the applications is trusted application market 106 or untrusted application market 108.

User interface (UI) 202 may refer to a graphical user interface (GUI), web-based UI, and/or touchscreen by which a user of mobile device 102 and/or workstation 104 provides graphical, textual, or auditory input to remediation gateway server 112 to implement remediating of rogue applications.

Remediation gateway server database 204 may refer to a storage unit incorporated into, otherwise associated with, remediation gateway server 112. Remediation gateway server database 204 may store therein, as non-limiting examples, security and policy settings of a user or entity that exercises control over mobile device 102 and/or workstation 104; trusted market application signatures; security manager methods and classes; best practices security and policy settings, etc., in accordance with the various embodiments of remediating rogue applications described herein.

Malicious application signature database 206 may refer to another storage unit incorporated into, or otherwise associated with, remediation gateway server 112 that stores signatures and/or certificates of known malicious applications. Accordingly, various embodiments of remediating rogue applications may contemplate remediation gateway server 112 being connected to a network of other embodiments thereof, thus providing a network by which captured signatures of detected malicious applications may be shared.

Detected malicious application signature service 208 may refer to a component or module that may be configured, programmed, or otherwise designed to analyze a call profile of potentially malicious method or system calls by comparing them to stored malicious application signatures. Non-limiting examples of known categories of malicious application signatures which may be stored therein may include re-packaging signatures, update signatures, drive-by downloads, over-privileges, adware, spyware, etc.

Decompiler/parser 210 may refer to a component or module that may be configured, programmed, or otherwise designed to convert native or executable code of the application to source code, e.g., Java. Alternatively, decompiler/parser 210 may be configured, programmed, or otherwise designed to merely scan or parse the existing code of the application.

System/method call profiler 212 may refer to a component or module that may be configured, programmed, or otherwise designed to parse or analyze the source code of the application that has been converted, scanned, or parsed by decompiler/parser 210, to identify some or all system or method calls that may be potentially malicious. The identification of a system or method call as being malicious may be based on, e.g., stored best practices security and policy settings.

Application code modifier 214 may refer to a component or module that may be configured, programmed, or otherwise designed to remove and/or replace the system or method calls that have been identified as being potentially malicious in the application downloaded to remediation gateway server 112. For example, system or method calls that have been identified as being potentially malicious may be replaced with relevant system or method calls and/or custom code that may be stored in remediation gateway server database 204 that are configured to inspect corresponding behavior of the application or program, as well as arguments thereof, and perform at least one check at runtime. That is, the identification of method or system calls that may be potentially malicious may be based on an analysis of runtime behavior. In some example embodiments, the custom code may be proactively written and stored, based on a compilation of past rogue system and/or method calls.

Application rebuilder 216 may refer to a component or module that may be configured, programmed, or otherwise designed to rebuild the application, from which potentially malicious system or method calls have been removed, using the relevant system or method calls and/or custom code that may be stored in remediation gateway server database 204. Thus, application rebuilder may provide the application with required functionality and at least desired measures of privacy and security.

Application runtime virtual modeler 218 may refer to a component or module that may be configured, programmed, or otherwise designed to execute the application, as part of a dynamic analysis, to observe the impact of the executed application on either of mobile device 102 or workstation 104, as well as any network connected thereto. Such functionality may be implemented as part of a dynamic analysis, which may alternatively be referred to as a sandbox analysis, to identify irregularities, including potential rogue or potentially malicious behavior, i.e., rogue system or method calls.

Application runtime virtual modeler 218 may be further configured, programmed, or otherwise designed to test a re-built application in a virtual environment.

Remediated application database 220 may refer to a storage unit incorporated into, or otherwise associated with, remediation gateway server 112 that stores applications that have been re-built, so that trusted system or method calls and trusted signatures may be utilized for comparison against calls and signatures from applications, which are at least suspected of being rogue or malicious applications that are subsequently downloaded to remediation gateway server 112.

In accordance with at least one alternative embodiment, workstation 104, depicted and described with reference to FIG. 1, may refer to a client device that is further configured to host and/or deploy remediation manager 200 and all corresponding components including, but not limited to, user interface (UI) 202, remediation gateway server database 204, a malicious application signatures database 206, detected malicious application signatures service 208, decompiler/parser 210, system/method call profiler 212, an application code modifier 214, application rebuilder 216, application runtime virtual modeler 218, and remediated applications database 220.

Thus, by such alternative embodiments, mobile device 102 may access one or both of trusted app market 106 and untrusted app market 108 directly, i.e., without relying on service provider 110 as an application service provider. The aforementioned remediation gateway server database 204, a malicious application signatures database 206, detected malicious application signatures service 208, decompiler/parser 210, system/method call profiler 212, an application code modifier 214, application rebuilder 216, application runtime virtual modeler 218, and remediated applications database 220 may be initially populated when deployed upon workstation 104; and, if needed, may be further updated by service provider 110.

Figure 3:
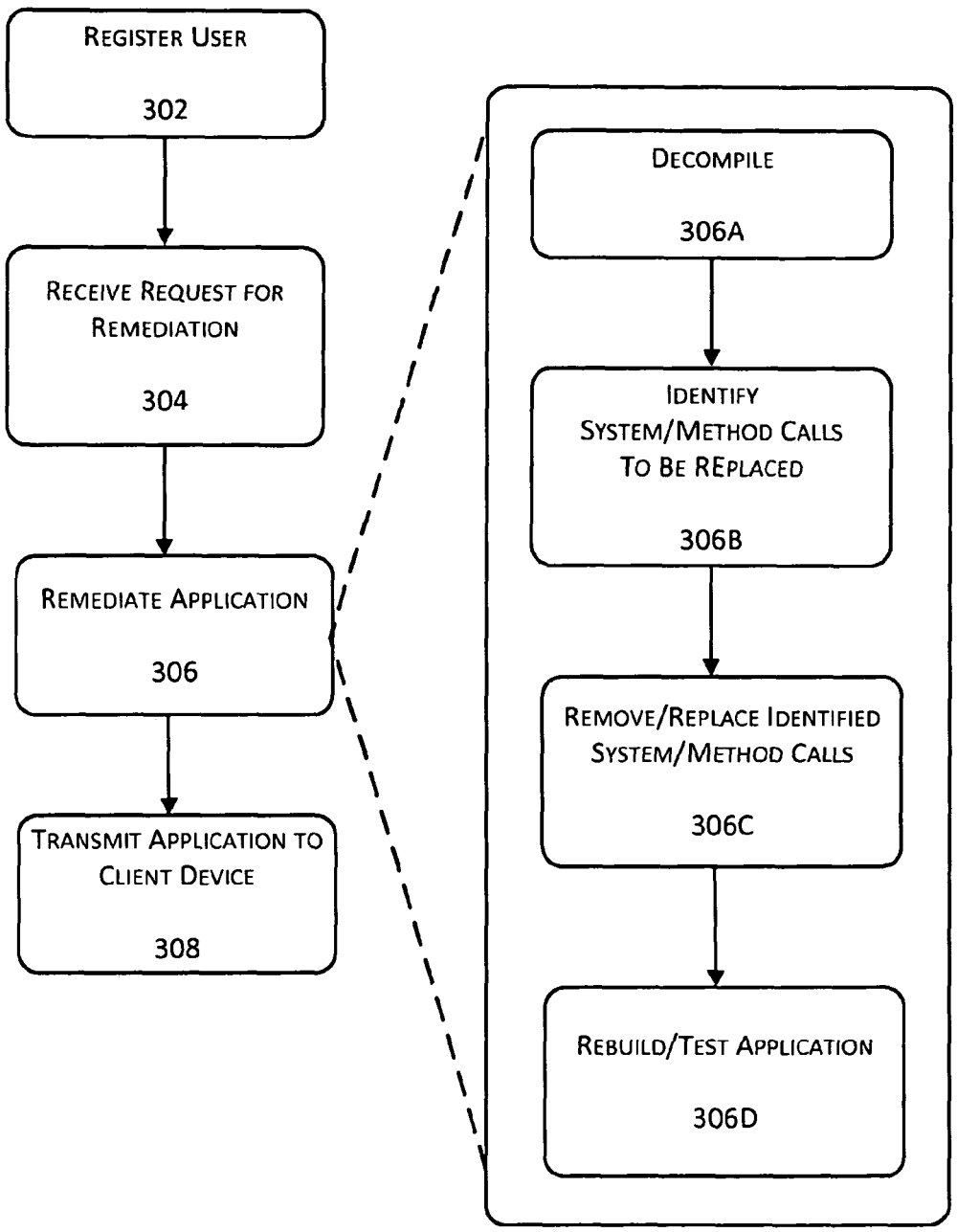
FIG. 3 shows an example processing flow, and sub-flow, of operations for remediating one or more rogue applications, arranged in accordance with at least some embodiments described herein.

FIG. 3 shows an example processing flow, including a sub-flow, of operations for remediating one or more rogue applications, arranged in accordance with at least some embodiments described herein. Processing flow 300 may be implemented by components and modules, including an operating system, which may be configured, programmed, or otherwise designed to be executed on remediation gateway server 112. Processing flow 300 may include one or more operations, actions, or functions depicted by one or more blocks 302, 304, 306, and 308. Further, block 306 may be further described with the sub-flow of operations, actions, or functions depicted by one or more blocks 306A, 306B, 306C, and 306D. Although illustrated as discrete blocks, various blocks may be divided into additional blocks, combined into fewer blocks, or eliminated, depending on the desired implementation. Processing flow 300 may start at block 302.

Block 302 (Register User) may refer to remediation manager 200 receiving profile information and/or security and policy settings of a user of mobile device 102 and/or workstation 104, via UI 202, and storing the received profile information and/or security and policy settings in remediation gateway server database 204. Such profile information and/or security and policy settings may be described or categorized as private information that the user is willing to have released, types of application functionality for which such private information may be released, and other context for the release of such private information. Processing flow 300 may proceed from block 302 to block 304.

Block 304 (Receive Request for Remediation) may refer to remediation manager 200 downloading or otherwise receiving an application, which was transmitted to remediation gateway server 112, via UI 202. The source of the application may be trusted application market 106 or untrusted application market 108, though the latter is likely according to multiple embodiments. That is, in accordance with the embodiments of remediating rogue applications described herein, it is likely, though not exclusively so, that the direct or indirect source of the aforementioned application is untrusted application market 108; therefore, the application may be at least suspected of being rogue or malicious.

In accordance with at least one example embodiment, the user of mobile device 102 and/or workstation 104 may transmit a request to remediation manager 200 to download, analyze, and, if needed, remediate an application according to the registered privacy and security requirements. In accordance with at least one other example embodiment, the user of mobile device 102 and/or workstation 104 may install the application thereon and then send the request for remediation to remediation gateway server 112 when local anti-malware software determines that the application is rogue or malicious. Processing flow 300 may proceed from block 304 to block 306.

Block 306 (Remediate Application) may refer to remediation manager managing, at least, remediation of the application that is, at least, suspected of being rogue or malicious. Block 306 may include one or more operations, actions, or functions, depicted by one or more blocks 306A, 306B, 306C, and 306D, performed under the guidance and/or direction of remediation manager 200. Further, the remediation of an application that is, at least, suspected of being rogue or malicious may be performed based on, e.g., the user's registered security and policy settings, trusted market application signatures, secure manager methods and classes, and best practices security and policy settings, all of which may be stored in remediation gateway server database 204. Although illustrated as discrete blocks, these blocks may also be divided into additional blocks, combined into fewer blocks, or eliminated, depending on the desired implementation. Processing of block 306 may start at sub-block 306A.

Sub-block 306A (Decompile) may refer to remediation manager 200 invoking decompiler/parser 210 to convert native or executable code of the application to source code, e.g., Java. Alternatively, decompiler/parser 210 may be invoked to scan or parse the existing code of the application. Processing of block 306 may proceed from sub-block 306A to sub-block 306B.

Sub-block 306B (Identify System/Method Calls to be Replaced) may refer to remediation manager 200 invoking system/method call profiler 212 to analyze the converted source code of the application to identify system or method calls that may be potentially malicious based on, at least, the stored best practices security and policy settings. In accordance with the alternative embodiment by which decompiler/parser 210 may be invoked to scan or parse the existing code of the application, system/method call profiler 212 may be further invoked to identify all system or method calls that may be potentially malicious. Regardless of the implementation embodiment, system/method call profiler 212 may generate a system/method call profile of any identified potentially malicious calls for the application.

Remediation manager 200 may then invoke detected malicious application signature service 208 to check the system/method call profile of identified potentially malicious calls against the stored contents of malicious application signatures database 206. Non-limiting examples of known categories of malicious application signatures which may be stored therein may include re-packaging signatures, update signatures, drive-by downloads, over-privileges, adware, spyware, etc. In accordance with at least one example embodiment, remediation manager 200 may invoke detected malicious application signature service 208 to hash all file packers of the application and compare the hash result to a list of known malicious files.

Sub-block 306B may alternatively refer to remediation manager 200 invoking application runtime virtual modeler 218 to execute the application, as part of a dynamic analysis, to observe the impact of the executed application on either of mobile device 102 or workstation 104, as well as any network connected thereto. In accordance with such a dynamic, i.e., sandbox, analysis, strong indicators of the application being a rogue or malicious application include one or more configuration changes, registry tampering, network redirections, installation of extraneous executables, buffer overflows, memory overflow, memory corruption, etc. Thus, system or method calls that may be potentially malicious may be further identified. Processing of block 306 may proceed from sub-block 306B to sub-block 306C.

Sub-block 306C (Remove/Replace Identified System/Method Calls) may refer to remediation manager 200 invoking application code modifier service 214 to remove and/or replace the system or method calls that have been identified as being potentially malicious. In at least one example embodiment, the system or method calls that have been identified as being potentially malicious may be replaced with relevant system or method calls and/or custom code that may be stored in remediation gateway server database 204. Processing of block 306 may proceed from sub-block 206C to sub-block 206D.

Sub-block 306D (Rebuild/Test Application) may refer to remediation manager invoking application rebuilder service 216 to rebuild the application with the relevant system or method calls and/or custom code that may be stored in remediation gateway server database 204 to provide required functionality for the application and to further provide at least desired measures of privacy and security.

Remediation manager 200 may then, again, invoke application runtime virtual modeler 218 to test the re-built application in a virtual environment. Upon successful execution of the re-built application, i.e., with no rogue or malicious system or method calls, processing flow may proceed from block 306 to block 308.

Block 308 (Transmit Application to Client Device) may refer to remediation manager storing the rebuilt application in remediation application database 220, for future reference, and transmitting the rebuilt application back to mobile device 102 or workstation 104 for trusted execution thereon.

Accordingly, users of a mobile device, or workstation, may receive a remediated application that has been rewritten with optimal security and privacy policy functionality incorporated therein. In accordance with user security and policy settings, a user may be able to change privacy policies for the remediated application at runtime.

FIG. 4 shows a block diagram illustrating an example computing device by which various example solutions described herein may be implemented, arranged in accordance with at least some embodiments described herein.

In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (μP), a microcontroller (μC), a digital signal processor (DSP), or any combination thereof. Processor 404 may include one or more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include trusted remediation manager 200 that is configured to coordinate the functions as described herein including those described with respect to processing flow 300 of FIG. 3. Program data 424 may include data stored in remediation gateway server database 204 that may be utilized by the components or modules invoked by remediation manager 200 as described herein. Application 422 may be arranged to operate with program data 424 on operating system 420 such that implementations of remediating of rogue applications may be implemented as described herein. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and non-volatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 544 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for system configuration via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a CD, a DVD, a digital tape, a computer memory, etc.; and a transmission type medium such as a digital and/or an analog communication medium, e.g., a fiber optic cable, a waveguide, a wired communication link, a wireless communication link, etc.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general, such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general, such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A remediation system, comprising:
a mobile communication device to which an application is to be installed; and
a remediation server configured to:
receive profile information and security and policy settings of a user of the mobile communication device;
receive, from the user, a request to remediate the application based on the received profile information and the received security and policy settings of the user;
remediate the application by:
identification of malicious code section associated with the application based on the received profile information, the received security and policy settings of the user, and a comparison of the application to stored signatures or certificates of known malicious applications,
elimination of the identified malicious code section from the application,
rebuild of the application by insertion, in place of the eliminated malicious code section, code that complies with the received profile information and the received security and policy settings of the user of the mobile communication device, and
test of the rebuilt application in a virtual environment; and
transmit the rebuilt application to the mobile communication device for installation.

2. The remediation system of claim 1,
wherein the remediation server is configured to remediate the application by:
identification, based on a statistical analysis, of potential malicious method or system calls; and
replacement of the identified potential malicious method or system calls with one or more custom method or system calls.

3. The remediation system of claim 1, wherein the remediation server is implemented as a service by a service provider.

4. The remediation system of claim 1, wherein the remediation server is implemented as a tool on a workstation to which the mobile communication device is registered.

5. A non-transitory computer-readable medium that stores instructions thereon that, when executed, cause one or more processors to execute operations directed towards remediating rogue applications, the operations comprising:
receive an application;
receive profile information and security and policy settings of a user of a mobile communication device;
receive, from the user, a request to remediate the application based on the received profile information and the received security and policy settings of the user;
identify potentially malicious code section associated with the application based on the received profile information, the received security and policy settings of the user, and a comparison of the application to stored signatures or certificates of known malicious applications;
remove the identified potentially malicious code section from the application;
rebuild the application by insertion, in place of the removed potentially malicious code section, of replacement code that complies with the received profile information and the received security and policy settings of the user of the mobile communication device to remediate the application;
test the rebuilt application in a virtual environment; and
transmit the rebuilt application to the mobile communication device.

6. The non-transitory computer-readable medium of claim 5, wherein the non-transitory computer-readable medium is included in a software framework of a remediating service.

7. The non-transitory computer-readable medium of claim 5, wherein the non-transitory computer-readable medium is configured to be executed on a workstation to which the mobile communication device is communicatively coupled.

8. The non-transitory computer-readable medium of claim 5, wherein the application is received after purchase or prior to installation thereof.

9. The non-transitory computer-readable medium of claim 5, wherein the identification includes:
conversion of executable code to source code;
parse of source code or executable code; and
identification of method or system calls that may be potentially malicious.

10. The non-transitory computer-readable medium of claim 9, wherein the identification of method or system calls that may be potentially malicious is executed based on a statistical analysis.

11. The non-transitory computer-readable medium of claim 10, wherein the identification of method or system calls that may be potentially malicious includes a comparison of the source code or executable code against the stored signatures or certificates of known malicious applications.

12. The non-transitory computer-readable medium of claim 9, wherein the identification of method or system calls that may be potentially malicious is executed based on pre-registered settings.

13. The non-transitory computer-readable medium of claim 5, wherein the replacement code includes custom code.

14. The non-transitory computer-readable medium of claim 5, wherein the test includes execution of the rebuilt application in the virtual environment which is an application runtime virtual modeling service.

15. The non-transitory computer-readable medium of claim 5, wherein the operations are automated to be executed upon purchase of the application attributed to a registered user's account.

16. A method to remediate applications, the method comprising:
receiving, from a mobile communication device, an application suspected of having malicious code;
receiving profile information and security and policy settings of a user of the mobile communication device;
receiving, from the user, a request to remediate the application based on the received profile information and the received security and policy settings of the user;
remediating the application by:
identifying malicious code section associated with the application based on the received profile information and the received security and policy settings of the user, and by executing the application for dynamic analysis, eliminating the identified malicious code section from the application, rebuilding the application by incorporating, in place of the eliminated malicious code section, code that complies with the received profile information and the received security and policy settings of the user of the mobile communication device, and testing the rebuilt application in a virtual environment; and transmitting the rebuilt application to the mobile communication device.

17. The method of claim 16, wherein the code that complies with the received profile information and the received security and policy settings includes stored custom code.

18. The method of claim 16, wherein the identifying includes:

identifying one or more irregularities or potentially malicious behavior, wherein the one or more irregularities or potentially malicious behavior includes one or more of configuration changes, registry tampering, network redirections, installation of rogue executables, buffer overflows, or memory corruption.

19. The method of claim 16, wherein the identifying is executed based on analyzing runtime behavior.

20. The method of claim 16, wherein the received profile information and the received security and policy settings of the user of the mobile communication device relate to: private information that is authorized for release, types of application functionality for which the private information is authorized for release, or context for the authorized release of the private information.

\* \* \* \* \*

UNITED STATES PATENT AND TRADEMARK OFFICE
CERTIFICATE OF CORRECTION

PATENT NO. : 9,680,864 B2  Page 1 of 1
APPLICATION NO. : 14/238542
DATED : June 13, 2017
INVENTOR(S) : Khesin It is certified that error appears in the above-identified patent and that said Letters Patent is hereby corrected as shown below:

In the Specification

In Column 9, Line 5, delete "one more" and insert -- one or more --, therefor.

In Column 10, Lines 4-5, delete "peripheral interfaces 544" and insert -- peripheral interfaces 444 --, therefor.

In Column 12, Line 26, delete "recitation no" and insert -- recitation, no --, therefor.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*